United States Patent
Yamada et al.

(10) Patent No.: US 8,321,099 B2
(45) Date of Patent: Nov. 27, 2012

(54) DEVICE AND METHOD FOR CONTROLLING AUTOMATIC GEARBOX

(75) Inventors: Naohiro Yamada, Atsugi (JP); Tsukasa Hayashi, Isehara (JP)

(73) Assignee: Jatco Ltd, Fuji-shi (JP)

( * ) Notice: Subject to any disclaimer, the term of this patent is extended or adjusted under 35 U.S.C. 154(b) by 151 days.

(21) Appl. No.: 12/865,160

(22) PCT Filed: Jan. 26, 2009

(86) PCT No.: PCT/JP2009/051176
§ 371 (c)(1),
(2), (4) Date: Jul. 29, 2010

(87) PCT Pub. No.: WO2009/113332
PCT Pub. Date: Sep. 17, 2009

(65) Prior Publication Data
US 2010/0332092 A1    Dec. 30, 2010

(30) Foreign Application Priority Data

Mar. 13, 2008   (JP) .................. 2008-063444

(51) Int. Cl.
- *G06F 7/00* (2006.01)
- *G06F 17/00* (2006.01)
- *G06F 19/00* (2011.01)
- *F16H 61/40* (2010.01)

(52) U.S. Cl. ................. 701/51; 701/55; 701/58; 477/68

(58) Field of Classification Search ............ 701/51, 701/53, 54, 55, 56, 57, 58, 60, 61, 62, 64, 701/67, 87, 95; 477/15, 31, 34, 42, 43, 46, 477/55, 68, 69, 75, 77, 91, 101, 105
See application file for complete search history.

(56) References Cited

U.S. PATENT DOCUMENTS

| | | | |
|---|---|---|---|
| 4,582,182 A | | 4/1986 | Takeda et al. |
| 4,852,006 A | * | 7/1989 | Speranza ................... 701/55 |
| 5,079,972 A | * | 1/1992 | Iizuka ..................... 477/154 |
| 5,270,628 A | | 12/1993 | Noguchi et al. |
| 5,628,705 A | * | 5/1997 | Kashiwabara ............ 477/46 |
| 5,695,428 A | * | 12/1997 | Yuasa et al. .............. 477/48 |
| 5,762,581 A | | 6/1998 | Kozaki et al. |
| 5,857,937 A | | 1/1999 | Ashizawa et al. |
| 5,959,572 A | | 9/1999 | Higashimata et al. |
| 6,044,321 A | | 3/2000 | Nakamura et al. |
| 6,085,140 A | * | 7/2000 | Choi ......................... 701/55 |
| 6,157,884 A | * | 12/2000 | Narita et al. ............. 701/51 |

(Continued)

FOREIGN PATENT DOCUMENTS
DE    103 30 155 A1    1/2005
(Continued)

OTHER PUBLICATIONS
U.S. Appl. No. 12/865,158, filed Jul. 29, 2010, Yamada.
(Continued)

*Primary Examiner* — Khoi Tran
*Assistant Examiner* — Abby Lin
(74) *Attorney, Agent, or Firm* — Foley & Lardner LLP

(57) ABSTRACT

When an accelerator pedal opening angle is large, a target vehicle speed is calculated using a read-ahead vehicle speed and, when the accelerator pedal opening angle is small, the target gear shift ratio is calculated using an actual vehicle speed.

6 Claims, 3 Drawing Sheets

U.S. PATENT DOCUMENTS

| | | | |
|---|---|---|---|
| 6,188,943 B1 * | 2/2001 | Uchida et al. | 701/54 |
| 6,370,468 B1 * | 4/2002 | Koga et al. | 701/91 |
| 6,574,535 B1 | 6/2003 | Morris et al. | |
| 7,338,406 B2 | 3/2008 | Shimoda | |
| 8,002,654 B2 | 8/2011 | Oshiumi et al. | |
| 8,112,204 B2 * | 2/2012 | Yamada et al. | 701/51 |
| 2001/0020789 A1 | 9/2001 | Nakashima | |
| 2004/0097328 A1 * | 5/2004 | Makiyama et al. | 477/43 |
| 2005/0192133 A1 | 9/2005 | Oshiumi et al. | |
| 2006/0231310 A1 | 10/2006 | Suzuki et al. | |
| 2007/0100535 A1 | 5/2007 | Yasui et al. | |
| 2008/0189021 A1 | 8/2008 | Inoue et al. | |
| 2009/0248233 A1 | 10/2009 | Yamada et al. | |
| 2010/0332092 A1 | 12/2010 | Yamada et al. | |
| 2011/0054751 A1 | 3/2011 | Yamada | |
| 2011/0054755 A1 | 3/2011 | Yamada | |

FOREIGN PATENT DOCUMENTS

| | | |
|---|---|---|
| EP | 1 420 194 A2 | 5/2004 |
| JP | 03-103661 | 4/1991 |
| JP | 05-010434 A | 1/1993 |
| JP | 07-248057 A | 9/1995 |
| JP | 09-210159 A | 8/1997 |
| JP | 11-241764 A | 9/1999 |
| JP | 11-325231 A | 11/1999 |
| JP | 2001-324004 A | 11/2001 |
| JP | 2003-254426 A | 9/2003 |

OTHER PUBLICATIONS

N. Yamada, U.S. PTO Office Action, U.S. Appl. No. 12/865,158, dated Jun. 1, 2012, 17 pages.

* cited by examiner

DEVICE AND METHOD FOR CONTROLLING AUTOMATIC GEARBOX

CROSS-REFERENCE TO RELATED APPLICATIONS

This application is a National Stage of International Application No. PCT/JP2009/051176 filed Jan. 26, 2009, which claims priority to Japanese Patent Application No. 2008-063444 filed Mar. 13, 2008, the disclosure of both are incorporated by reference in their entirety.

THE NAMES OF THE PARTIES TO A JOINT RESEARCH AGREEMENT

Not applicable

BACKGROUND OF THE INVENTION (1) Field of the Invention

The present invention relates to a device and method for controlling an automatic transmission which perform a control of a gear shift ratio on a basis of an estimated value of a vehicle speed after a predetermined time.

(2) Description of Related Art Including Information Disclosed Under 37 C.F.R. §§1.97 and 1.98

A technique described in Japanese Patent Application Publication No. Heisei 9-21059 (this corresponds to a U.S. Pat. No. 5,857,937) and which uses a gear shift control using an estimated vehicle speed after a predetermined time is known, with an aim to prevent an occurrence of an engine racing or so forth at a time of a gear shift control due to a delay in a mechanical component during the gear shift control.

Another technique for determining a gear shift stage using a read-ahead vehicle speed is described in Japanese Patent Application Publication No. Heisei 11-325231. In an automatic gearbox, the gear shift stage is selected using the shift map in which generally ideal shift lines are set. The ideal shift lines serve to determine the gear shift lines on a basis of actual vehicle speed and an accelerator pedal opening angle. For example, in a case of a geared automatic transmission, in a region in which an accelerator pedal opening angle is large, a region of a low shaft stage is widely set to maintain the low gear shift stage. On the other hand, in a region in which the accelerator opening angle is small, respective regions of the shift stages are set to be narrowed to enable up-shifts in sequence.

BRIEF SUMMARY OF THE INVENTION

At this time, in the prior art structure, when the accelerator pedal opening angle is transferred from a high opening angle state at one stretch to a low opening angle state while the control is carried out using the read-ahead vehicle speed, an unnecessary gear shift different from a driver's intention is carried out so that an unpleasant feeling may be given to the vehicle driver.

It is an object of the present invention to provide control device and control method for an automatic transmission which are capable of selecting a gear shift stage in accordance with the driver's intention regardless of a magnitude of the accelerator pedal opening angle.

To achieve the above-described object, in the present invention, the read-ahead vehicle speed is used to calculate a target gear shift ratio when the accelerator pedal opening angle is large and the target gear shift ratio is calculated using the actual vehicle speed when the accelerator opening angle is small. Specifically, in the invention described in the claim 1, a control device for an automatic transmission in which a speed ratio between an input shaft connected to an engine side of a vehicle and an output shaft connected to a driving system of the vehicle is modified, the control device comprising: vehicle speed detecting means for detecting an actual vehicle speed which is a traveling speed of the vehicle; vehicle speed estimating means for calculating a read-ahead vehicle speed which is a target future vehicle speed by a predetermined time on a basis of the actual vehicle speed; accelerator pedal opening angle detecting means for detecting an accelerator pedal opening angle; target gear shift ratio calculating means for calculating a target gear shift ratio on a basis of the read-ahead vehicle speed and the accelerator pedal opening angle when the accelerator pedal opening angle is equal to or larger than a first predetermined value and for calculating the target gear shift ratio on a basis of the actual vehicle speed and the accelerator pedal opening angle when the accelerator opening angle is smaller than a second predetermined value; and gear shift control means for controlling the automatic transmission on a basis of the target gear shift ratio.

In addition, in the invention described in claim 3, a control device for an automatic transmission, the automatic transmission being configured to modify a speed ratio between an input shaft connected to an engine side of a vehicle and an output shaft connected to a driving system of the vehicle, the control device comprising: a vehicle speed detection section configured to detect an actual vehicle speed which is a traveling speed of the vehicle; an accelerator pedal opening angle detecting section configured to detect an accelerator pedal opening angle; and a controller, the controller being configured to calculate a read-ahead vehicle speed which is a target future vehicle speed by a predetermined time on a basis of the actual vehicle speed, to calculate a target gear shift ratio on a basis of the read-ahead vehicle speed and the accelerator pedal opening angle when the accelerator pedal opening angle is equal to or larger than a first predetermined value, to calculate the target gear shift ratio on a basis of the actual vehicle speed and the accelerator pedal opening angle when the accelerator pedal opening angle is smaller than a second predetermined value, and to control the automatic transmission on the basis of the target gear shift ratio.

Furthermore, in the invention described in claim 5, a control method for an automatic transmission, the automatic transmission being configured to modify a speed ratio between an input shaft connected to an engine side of a vehicle and an output shaft connected to a driving system of the vehicle, the control method comprising: detecting an actual vehicle speed which is a traveling speed of the vehicle; detecting an accelerator pedal opening angle; calculating a read-ahead vehicle speed which is a target future vehicle speed by a predetermined time on a basis of the actual vehicle speed; calculating a target gear shift ratio on a basis of the read-ahead vehicle speed and the accelerator pedal opening angle when the accelerator is equal to or larger than a first predetermined value; calculating the target gear shift ratio on a basis of the actual vehicle speed and the accelerator pedal opening angle when the accelerator opening angle is smaller than a second predetermined value; and controlling the automatic transmission on a basis of the target gear shift ratio.

Thus, even if the accelerator pedal opening angle is made small, an unnecessary gear shift is not carried out and favorable gear shift control in accordance with the driver's intention can be achieved.

DETAILED DESCRIPTION OF THE INVENTION

Hereinafter, a best mode achieving a control device for an automatic transmission according to the present invention will be described on a basis of a first preferred embodiment shown in drawings.

First Embodiment

Figure 1:
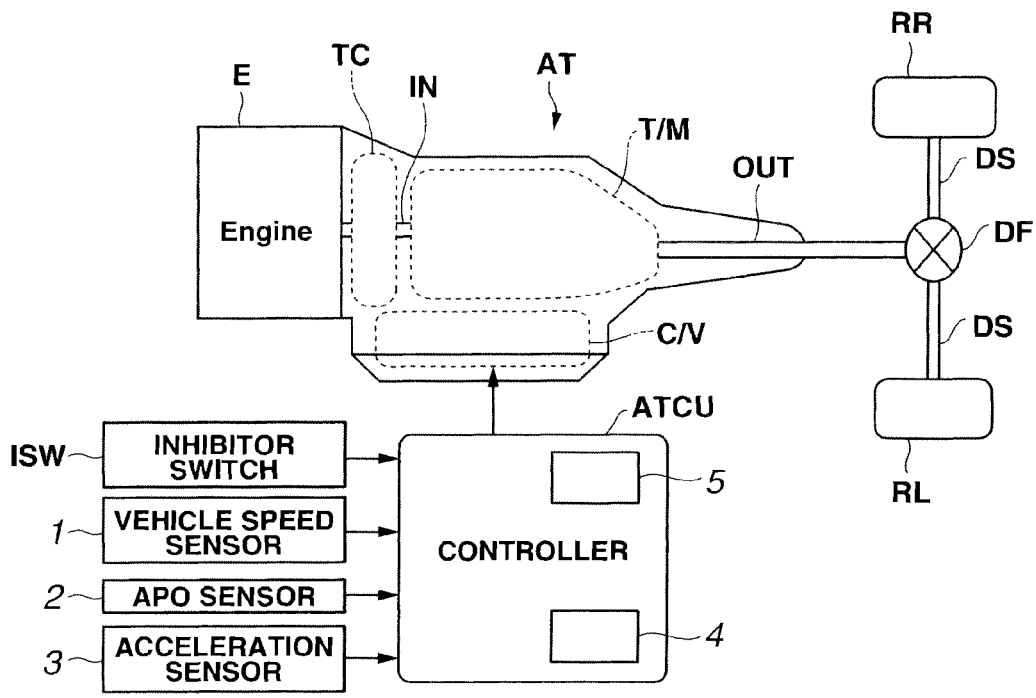
FIG. 1 is a whole system configuration view of a vehicle in which a control device for an automatic transmission in a first preferred embodiment is equipped.

First, a structure will be described. FIG. 1 shows a whole system configuration of a vehicle in which the control device for the automatic transmission in the first embodiment is equipped. The vehicle in the first embodiment is exemplified by a rear-wheel drive vehicle but the vehicle may be a front-wheel drive vehicle or a four-wheel drive vehicle.

The vehicle in the first embodiment includes an engine E, a torque converter TC, and an automatic transmission AT. A driving force outputted from engine E is transmitted to an input shaft IN of automatic transmission AT via torque converter TC. A plurality of planetary gear sets and a plurality of clutching elements T/M are provided within automatic transmission AT. A driving force gear-shifted by means of a gear shift stage determined from a combination of these clutching elements is transmitted from an output shaft OUT to a differential DF. In differential DF, the driving force is transmitted from a drive shaft of rear left and right road wheels RR, RL.

Automatic transmission AT is structured to enable a setting of a gear shift ratio according to a traveling state and to increase or decrease number of revolutions per unit time of input shaft IN to be outputted to output shaft OUT. As automatic transmission AT in the first embodiment, a geared automatic transmission of forward five speeds and a reverse first speed is mounted in the vehicle.

A plurality of clutching elements, a one-way clutch, and an oil pump are built in this automatic transmission AT. A clutching pressure regulated within a control valve C/V is supplied to each of the clutching elements. The gear ratio of the planetary gear sets is determined according to the combination of the clutching elements to achieve a desired shift stage.

In addition, at a time of the gear shift, a, so-called, replacement gear shift control is carried out to perform the gear shift. In the replacement gear shift control, a release side clutching element is progressively released and, at the same time, a clutch side clutching element is clutched. The release side clutching element is one of the clutching elements that achieves the gear shift stage before the gear shift stage. The clutch side clutching element is another clutching element that achieves the gear shift state after the gear shift stage.

An automatic transmission controller ATCU determines a gear shift stage of automatic transmission AT on a basis of various kinds of input information and outputs a control command signal to an actuator to achieve each of the gear shift stages (or gear shift ratios). In addition, automatic transmission controller ATCU includes: a vehicle speed estimation section 4 estimating a read-ahead vehicle speed VSP2 which is a future vehicle speed by a predetermined time; and a gear shift control section 5 which controls a clutch-and-release state of the clutching elements on a basis of various kinds of input information.

Automatic transmission controller ATCU inputs a range position signal of an inhibitor switch ISW representing a position of a shift lever selected by the driver, the actual vehicle speed from vehicle speed sensor 1, an accelerator opening angle signal from an APO sensor 2 detecting an accelerator pedal opening angle APO operated by the driver, and an acceleration signal from acceleration sensor 3 detecting an acceleration of the vehicle.

It should herein be noted that inhibitor switch ISW outputs a signal representing one of forward traveling range positions (D, L, 1, 2, and so forth), a reverse traveling range position (R), a neutral range position (N), and a parking range position (P). In the first embodiment, the traveling range includes both ranges of the forward traveling range and the reverse traveling range.

Figure 2:
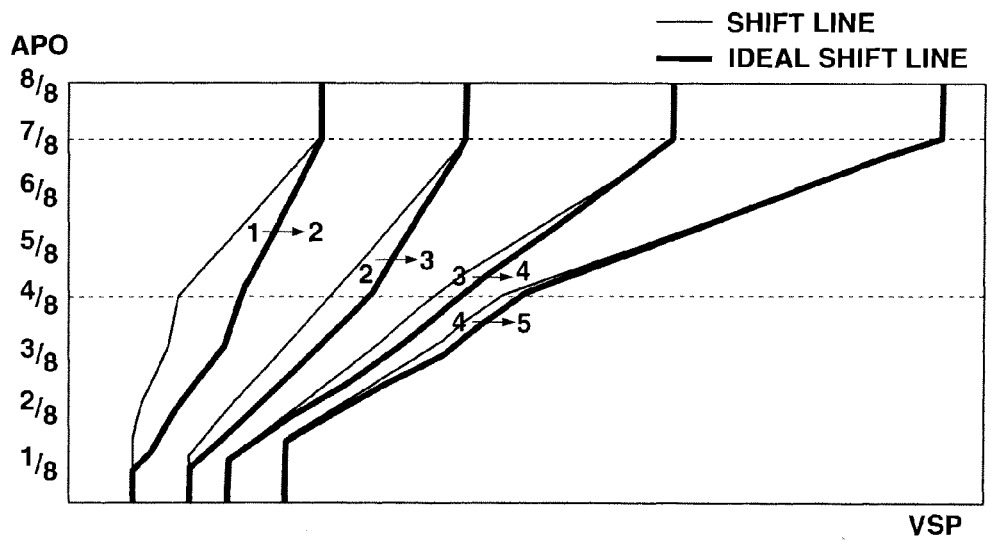
FIG. 2 is a shift map set within a gear shift control section in the first embodiment.

FIG. 2 shows a shift map set within gear shift control section 5. In this shift map, a lateral axis denotes vehicle speed VSP and a longitudinal axis denotes accelerator pedal opening angle APO. It should herein be noted that a point determined according to a vehicle speed and accelerator opening angle is described as a driving point. The driving point causes the gear shift stage in accordance with a region set within the shift map to be selected.

From the shift map in FIG. 2, bold solid lines denote ideal shift lines, each ideal shift line representing an ideal timing at which the gear shift is actually finished. In addition, each of fine solid lines set at a left side of each of the bold solid lines in FIG. 2 is a shift line outputting a gear shift command to finish the actual gear shift on the ideal gear shift line. The driving point is moved according to an increase or decrease of vehicle speed VSP and the increase or decrease of accelerator pedal opening angle APO. For example, when accelerator pedal opening angle APO is 3/8, the driving point crosses 1→2 shift line along with a rise in the vehicle speed and, when the driving point is moved from a region of a first speed to a region of a second speed, an up-shift occurs. Then, the gear shift is finished on 1→2 ideal shift line.
A relationship between the ideal gear shift line and the gear shift line will be described later.

Ideal shift lines are set as follows: regions of respective gear shift stages are narrowly set so as to enable easy up-shift in an area in which accelerator pedal opening angle APO is small and the regions of respective gear shift stages are widely set so as to enable maintenance of a lower gear shift stage as much as possible in another area in which accelerator opening angle APO is large.
Thus, when viewing respective gear shift stages from an accelerator pedal opening angle axial direction of FIG. 2, a zone in which a plurality of ideal gear shift lines are overlapped is present.

It should herein be noted that, in an actual practice, down-shift lines, coast traveling control lines, slip lock-up control lines, and so forth are set but the detailed description thereof will be omitted. Especially, as far as the down-shift lines are concerned, it is general that the down-shift lines are set to be at a lower vehicle speed side than the up-shift lines from the viewpoint of preventing a gear shift hunting. However, in order to simplify the explanation thereof, the up-shift line and down-shift line are set at the same position.

The gear shift map is divided into three regions in the accelerator opening APO axle. During an opening angle of 0 through 4/8 ($0 \leq APO < 4/8$), control falls in an ordinary control region in which an actual vehicle speed VSP detected by the vehicle speed sensor 1 is directly used to perform the gear shift control. An opening angle range of 7/8~8/8 ($7/8 \leq APO < 8/8$) indicates a read-ahead control region in which the gear shift control is performed using a read-ahead vehicle speed VSP which will be described later. An opening angle range of 4/8 through 7/8 ($4/8 \leq APO < 7/8$) indicates a weight control region in which the gear shift control is performed using a weighted vehicle speed VSP0 in which a weighting is carried out for a read-ahead vehicle speed VSP2 and an actual vehicle speed VSP in accordance with an accelerator opening angle APO.

In the ordinary control region, the gear shift control command is outputted at a time when actual vehicle speed VSP crosses shift line. The shift lines in this region are values preset on a basis of ideal shift lines. When the driving point crosses one of the shift lines, the driving point reaches to the ideal shift line after the predetermined time and at its timing the gear shift is completed. It should be noted that, during accelerator opening angle APO of 0~1/8, a slight delay is present from the issuance of the gear shift command to the completion of the gear shift so that the shift line and ideal shift line are set at the same positions.

In the weighting control region, the shift command is issued at a time when the weighted vehicle speed crosses the shift line. The weighted vehicle speed is a calculated value in which read-ahead vehicle speed VSP2 and actual vehicle speed VSP are weighted in accordance with accelerator pedal opening angle APO. Specifically, assuming weighted vehicle speed is VSP0, the calculation is made as follows:

$$VSP0=VSP2\{(APO-4/8)/(3/8)\}+VSP\{(7/8-APO)/(3/8)\}$$

When this weighted vehicle speed VSP0 has crossed the shift line, the gear shift command is issued. At this time, the driving point has reached to the ideal shift line and at this timing the gear shift operation is finished.

The shift line in the weight control region is set to a value connecting a point of the ideal shift line when accelerator pedal opening angle APO=7/8 and a point of the gear shift line when accelerator opening angle APO=4/8 with a straight line.

That is to say, at a high opening angle, actual vehicle speed components are few but read-ahead vehicle speed components are many from among components of weighted vehicle speed VSP0 so that the shift line is set to be placed in proximity to the ideal shift line. At a low opening angle, the shift line is set in proximity to the shift line in a case where only actual vehicle speed VSP is used as the ordinary control since the read-ahead vehicle speed components are few and the actual vehicle speed components are many.

As described above, when a weighted vehicle speed VSP0 is calculated, a smooth transition from the read-ahead vehicle speed to the ordinary
control becomes possible.

In the read-ahead control region, the shift line is set at the same position as the ideal gear shift line. Then, the gear shift command is outputted when the estimated driving point defined according to the read-ahead vehicle speed crosses the shift line. At this time, the gear shift is finished at a timing at which the driving point has reached to the ideal gear shift line.

[Relationship Between the Shift Line and Ideal Shift Line]

A relationship between the shift line and ideal shift line will, hereinbelow, be described.

As described above, automatic transmission AT carries out the gear shift operation according to engagement and release of the clutching elements. At this time, a release side clutching element is released and an engagement side clutching element is engaged.

A general gear shift operation is carried out by passing through a pre-charge phase during which a charge for a looseness in the engagement side clutching element is carried out, a torque phase during which an engagement pressure is supplied to the engagement side clutching element while an engagement pressure for the release side clutching element is slightly drawn out, an inertia phase during which, while the engagement pressure of the release side clutching element is decreased, the engagement pressure of the engagement side clutching element is increased to promote a variation in the gear ratio, and a gear shift completion phase during which the engagement pressure of the engagement side clutching element provides a complete engagement pressure according to a completion of the gear shift.

Such a technique in a case where an input torque is large and it is difficult to promote an advance of the gear shift particularly at the inertia phase and so forth, and a gear shift speed is controlled according to an engine torque down control and so forth is known. However, in general, there is a tendency for a gear shift time duration to become longer as an input torque becomes larger. In other words, a mechanical operation response characteristic and a delay element based on the input torque are present.

On the other hand, it is said that a correlation between a vehicle speed response range and a driveablity at each of the gear shift stages is present. Particularly, in order for the up-shift to become a rhythmical gear shift, it is desirable to complete the gear shift at a desired timing. A timing at which the gear shift is finished is the ideal shift line.

It should, herein, be noted that a fact that the gear shift is started from a time at which the driving point has reached to one ideal shift line causes a timing at which the gear shift is actually completed due to the delay element and so forth to become a timing different from the shift line (for example, high vehicle speed side) so that a predetermined driveablity cannot be obtained. Therefore, the shift line is set and the timing at which the gear shift is actually finished and the driving point are made coincident with each other.

[Read-Ahead Vehicle Speed]

Next, the read-ahead vehicle speed will, hereinbelow, be described. The above-described shift line is, up to the most, prescribed by the driving point and cannot be said that an influence due to the actual traveling environment or so forth is taken into consideration. For example, even if accelerator opening angle APO is large, vehicle speed VSP is actually raised under a traveling environment at which a vehicle load is large and a time to cross the ideal line becomes long. On the other hand, under a traveling environment at which a vehicle load is small, a time it takes to cross the ideal shift line becomes short. In order to cope with this state, respectively, the traveling environment is detected and a plurality of shift lines need to be set in accordance with the traveling environment, Thus, a control complexity and an increase in a memory capacity are introduced.

In this way, an appropriate setting of a timing in accordance with the traveling environment is required and this requirement is particularly required in a region in which accelerator pedal opening angle APO is so large that the gear shift time duration tends to be long.

Hence, a predetermined time future vehicle speed is estimated on a basis of actual vehicle speed VSP from actual vehicle speed sensor 1 and estimated vehicle speed is gear shift controlled as a read-ahead vehicle speed VSP2 (=estimated vehicle speed 2). Specifically, the gear shift command is outputted at a timing varied in accordance with the traveling environment when estimated read-ahead vehicle speed VSP2 crosses the ideal shift line set at the same position as the ideal shift line. Then, the gear shift is finished at a timing at which the driving point in accordance with actual vehicle speed VSP has reached to the ideal shift line after the predetermined time has elapsed.

Figure 3:
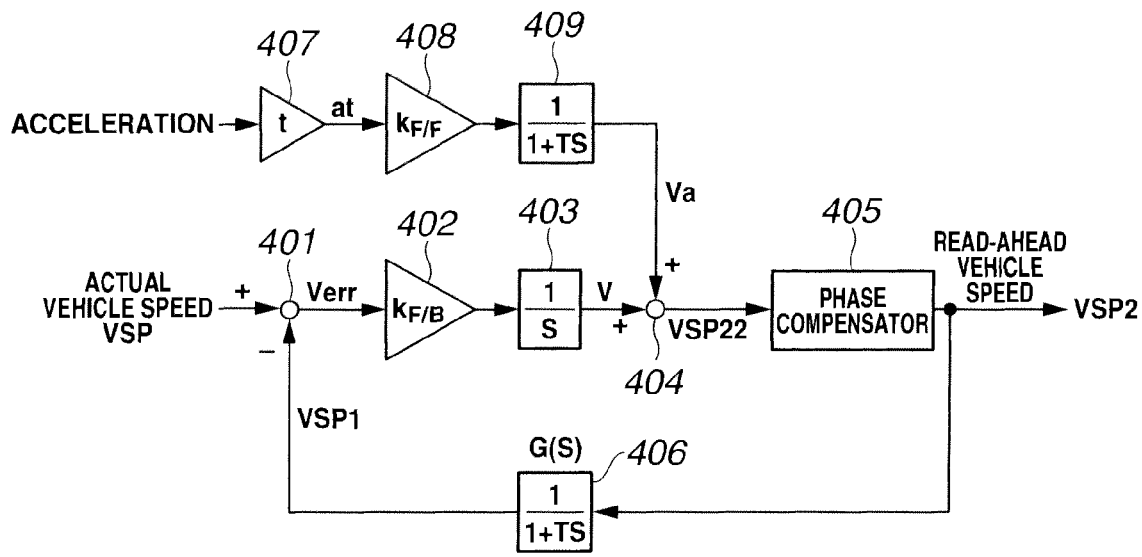
FIG. 3 is a control block diagram representing a read-ahead vehicle speed estimation process in a vehicle speed estimation section in the first embodiment.

FIG. 3 shows a control block diagram representing a read-ahead vehicle speed estimation process at vehicle speed estimation section 4. Vehicle speed estimation section 4 is constituted by an integrator 40 and a first-order delay 406. If an estimated vehicle speed VSP1 which is the present vehicle speed and actual vehicle speed VSP are coincident with each other, read-ahead vehicle speed VSP2 becomes the future vehicle speed by a time which accords with the delay element. The details of respective parts will hereinafter be made A vehicle speed deviation calculation section 401 calculates a vehicle speed deviation Verr from actual vehicle speed VSP and estimated vehicle speed VSP1 on a basis of the following equation.

$$\text{Verr}=\text{VSP}-\text{VSP1} \quad \text{(Equation 1)}$$

A feedback gain multiplication section 402 multiplies calculated vehicle speed deviation Verr by a feedback gain $k_{F/G}$.

An integrator 403 integrates $k_{F/B} \cdot \text{Verr}$ according to the following equation and calculates an integral calculation value V.

$$V = k_{F/B} \cdot \text{Verr}(1/s), \quad \text{(Equation 2)}$$

wherein s denotes a Laplace operator.

(Acceleration Component)

A predetermined time multiplication section 407 multiplies a time t after a predetermined time to be estimated by an acceleration detected by means of acceleration sensor 3 to calculate an acceleration component of at.

A feed-forward gain multiplication section 408 multiplies feed-forward gain $k_{F/F}$ by calculated acceleration component at.

A speed conversion section 409 acts a first order element shown in the following equation on at $\cdot k_{F/F}$ to calculate an acceleration component vehicle speed Va.

$$G(s)=1/(Ts+1), \quad \text{(Equation 3)}$$

wherein T denotes a time constant corresponding to a read-ahead time which is a target by a designer.

A vehicle speed addition section 404 calculates an addition of an integral calculation value V to an acceleration component vehicle speed Va on a basis of the following equation and calculates a phase compensation prior read-ahead vehicle speed VSP22.

$$\text{VSP22}=V+Va \quad \text{(Equation 4)}$$

A phase compensator 405 carries out a first-order/first-order phase compensation Gh(s) shown in the following equation for phase compensation prior read-vehicle speed VSP22 to calculate a read-ahead vehicle speed VSP2.

$$Gh(s)=(T2s+1)/(T1s+1), \quad \text{(Equation 5)}$$

wherein T1 and T2 denote phase compensation constants.

An introduction of this phase compensator 405 can set three design elements of phase compensation constants T1 and T2 and feedback gain $k_{F/B}$ for three unknown numbers of a first-order delay pole, a natural frequency, and a damping factor, these representing a stability of a system and a response characteristic of the system. According to the above-described setting, a system that the designer has desired can be designed. It should be noted that since the details thereof are disclosed in the Japanese Patent Application Publication No. Heisei 9-210159 (this corresponds to the U.S. Pat. No. 5,857,937 as described above), the details thereof will herein be omitted.

First-order delay 406 inputs read-ahead vehicle speed VSP2 and calculates a first order delay G(s) as shown in the following equation.

$$G(s)=1/(Ts+1), \quad \text{(Equation 3)}$$

wherein T denotes a time constant corresponding to a read-ahead time VSP2.

In other words, the delay element is acted upon read-ahead vehicle speed VSP2 to return to a state before a predetermined time. Thus, the vehicle speed at the present time on a basis of read-ahead vehicle VSP2 is estimated (estimated vehicle speed VSP1). When this estimated vehicle speed VSP1 and actual vehicle speed VSP are coincident with each other, read-ahead vehicle speed VSP2 is correct. If not coincident with each other, read-ahead vehicle speed VSP2 is corrected in accordance with vehicle speed deviation Verr.

[Vehicle Speed Setting Process Used for the Gear Shift Control]

Figure 4:
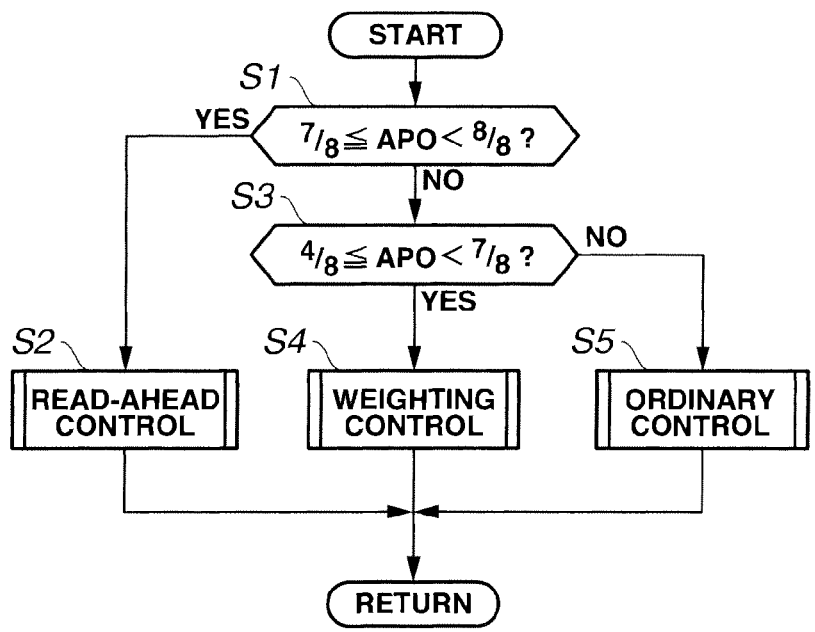
FIG. 4 is a flowchart representing a vehicle speed setting process in the first embodiment.

Next, a vehicle speed setting process used for the gear shift control will hereinbelow be described. FIG. 4 shows a flowchart representing a setting process of the feedback gain.

At a step S1, a determination is made of whether accelerator pedal opening angle APO is equal to or larger than 7/8 but is smaller than 8/8. If accelerator pedal opening angle APO is determined to be within this range, the routine goes to a step S2. Otherwise, the routine goes to a step S3. At step S2, the read-ahead control is executed using read-ahead vehicle speed VSP2.

At step S3, a determination is made of whether accelerator pedal opening angle APO is equal to or larger than 4/8 but smaller than 7/8. If accelerator pedal opening angle APO falls within this range, the routine goes to a step S4. Otherwise, the routine goes to a step S5. At step S4, the weighting control using weighted vehicle speed VSP0 is executed. At a step S5, the ordinary control using actual vehicle speed VSP is executed.

Figure 5:
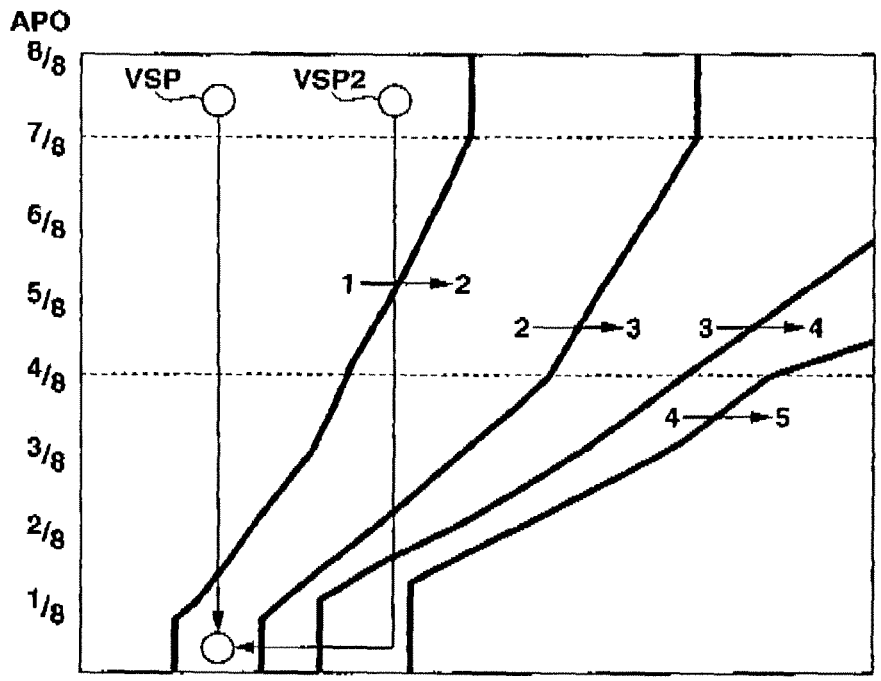
FIG. 5 is an explanatory view representing a gear shift control in a comparative example.
Figure 6:
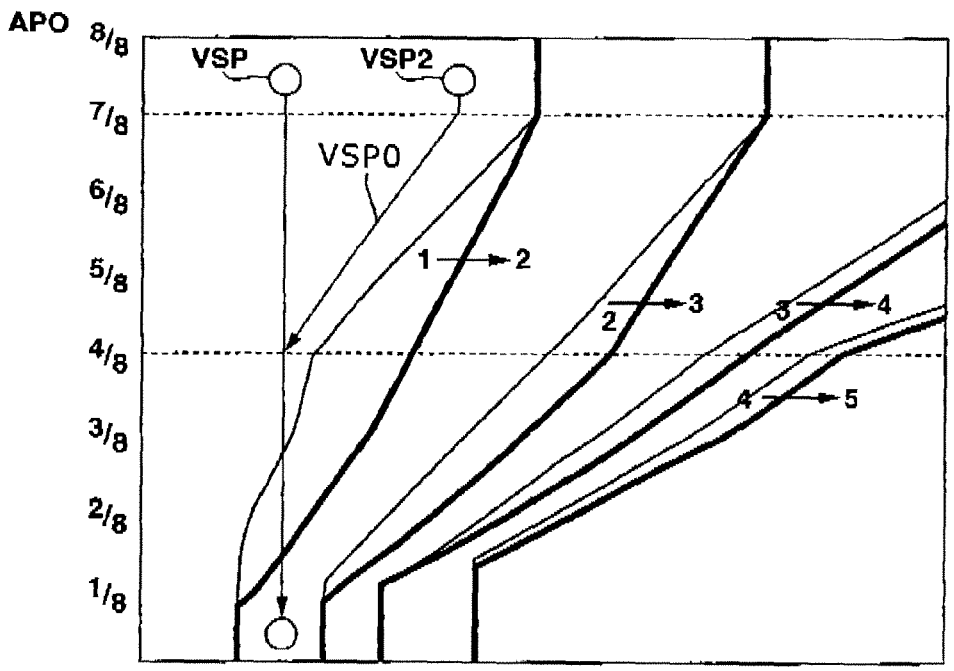
FIG. 6 is an explanatory view representing a gear shift control in the first embodiment.

Next, an action based on the above-described control will be described. FIG. 5 shows the gear shift control using read-ahead vehicle speed VSP0 for the whole region of accelerator pedal opening angle APO as the comparative example and FIG. 6 represents the gear shift control in the first embodiment.

Suppose that, as shown in FIG. 5, accelerator pedal opening angle APO is present in a region equal to or larger than 7/8 at a certain time point. At this time, read-ahead vehicle speed VSP2 is placed at a position more to the right side in FIG. 5 than the actual vehicle speed VSP. In this state, if the driver releases the accelerator pedal in a stepwise manner, the up-shift from the first speed (1st speed range) to the second speed (2nd speed range) is carried out on an actual vehicle speed VSP2 basis. Whereas, on read-ahead vehicle speed VSP2 basis, the shift command is outputted as 1-st speed→2-nd speed→3-rd speed→4-th speed→3-rd speed→2-nd speed so that a plurality of gear shift commands different from the intention of the driver are outputted and the driver receives the unpleasant feeling.

Whereas, in the gear shift control in the first embodiment, when the accelerator pedal is released from the region equal to or larger than 7/8, the shift command is outputted on a basis of the relationship between weighted vehicle speed VSP0 and the shift line at a stage at which accelerator opening angle APO is below 7/8.

Weighted vehicle speed VSP0 is weighted for actual vehicle speed VSP in accordance with accelerator pedal opening angle APO. Hence, as shown in FIG. 6, without crossing the shift line, weighted vehicle speed is varied transferring to actual vehicle speed side VSP progressively.

The gear shift command is outputted at a stage at which accelerator opening angle APO is reduced and exceeds 4/8 on a basis of the relationship between actual vehicle speed VSP and shift line. Then, as the gear shift command, an up-shift command of only first speed→second speed is outputted. Then, a plurality of gear shift commands different from the intention of the driver without giving the unpleasant feeling. Thus, the gear shift control along the intention of the driver can be achieved without giving the unpleasant feeling.

As described hereinabove, in the first embodiment, the following action and advantages listed below can be achieved.

(1) A control device for an automatic transmission in which a speed ratio between an input shaft connected to an engine side of a vehicle and an output shaft connected to a driving system of the vehicle is modified, the control device comprising: a vehicle speed sensor 1 as vehicle speed detecting means (vehicle speed detecting section) for detecting an actual vehicle speed VSP which is a traveling speed of the vehicle; a vehicle speed estimation section 4 configured to calculate a read-ahead vehicle speed VSP2 which is a target future vehicle speed by a predetermined time on a basis of actual vehicle speed VSP; an APO sensor 2 as accelerator pedal opening angle detecting means (as an accelerator pedal opening angle detection section) for detecting an accelerator pedal opening angle; a shift map as target gear ratio calculating means for calculating a target gear shift ratio on a basis of read-ahead vehicle speed VSP2 and accelerator pedal opening angle APO when accelerator pedal opening angle APO is equal to or a first predetermined value (7/8) and calculating the target gear shift ratio on a basis of actual vehicle speed VSP and accelerator pedal opening angle APO when accelerator opening angle APO is smaller than a second predetermined value (4/8); and a gear shift control section 5 which controls the automatic transmission on the basis of the target gear shift ratio.

Hence, even if the accelerator pedal opening angle becomes small, a favorable shift control in accordance with the intension of the vehicle driver can be achieved without unnecessary gear shift.

(2) When accelerator pedal opening angle APO is smaller than 7/8 but equal to or larger than 4/8, the target gear shift ratio is calculated on a basis of weighted vehicle speed VSP0, read-ahead vehicle speed VSP2 and actual vehicle speed VSP being weighted in accordance with accelerator pedal opening angle APO.

Thus, a smooth transition from the read-ahead control in which the read-ahead vehicle speed VSP2 is used to the ordinary control in which actual vehicle speed VSP is used can be made.

Next, other technical ideas will hereinafter be described. It should be noted that the actions and advantages are the same as those in items of (1) and (2).

(3) A control device for an automatic transmission, the automatic transmission (AT) being configured to modify a speed ratio between an input shaft (IN) connected to an engine side of a vehicle and an output shaft (OUT) connected to a driving system of the vehicle, the control device comprising: a vehicle speed detection section (1) configured to detect an actual vehicle speed which is a traveling speed of the vehicle; an accelerator pedal opening angle detecting section (2) configured to detect an accelerator pedal opening angle (APO); and a controller (ATCU), the controller being configured to calculate (4) a read-ahead vehicle speed (VSP2) which is a target future vehicle speed by a predetermined time on a basis of the actual vehicle speed, to calculate (shift map) a target gear shift ratio on a basis of the read-ahead vehicle speed and the accelerator pedal opening angle when the accelerator pedal opening angle is equal to or larger than a first predetermined value (7/8), to calculate the target gear shift ratio on a basis of the actual vehicle speed and the accelerator pedal opening angle when the accelerator pedal opening angle is smaller than a second predetermined value (4/8), and to control (5) the automatic transmission on the basis of the target gear shift ratio.

(4) The control device for the automatic transmission as set forth in item (3), wherein the first predetermined value is larger than the second predetermined value and the controller calculates the target gear shift ratio on a basis of a weighted vehicle speed for which the read-ahead vehicle speed and the actual vehicle speed are weighted in accordance with the accelerator pedal opening angle and the accelerator pedal opening angle, when the accelerator opening angle is smaller than the first predetermined value but is equal to or larger than the second predetermined value.

(5) A control method for an automatic transmission (AT), the automatic transmission being configured to modify a speed ratio between an input shaft (IN) connected to an engine side of a vehicle and an output shaft (OUT) connected to a driving system of the vehicle, the control method comprising: detecting (1) an actual vehicle speed (VSP) which is a traveling speed of the vehicle; detecting (2) an accelerator pedal opening angle (APO); calculating (4) a read-ahead vehicle speed (VSP2) which is a target future vehicle speed by a predetermined time on a basis of the actual vehicle speed; calculating (shift map) a target gear shift ratio on a basis of the read-ahead vehicle speed and the accelerator pedal opening angle when the accelerator is equal to or larger than a first predetermined value (7/8); calculating the target gear shift ratio on a basis of the actual vehicle speed and the accelerator pedal opening angle when the accelerator opening angle is smaller than a second predetermined value (4/8); and controlling (5) the automatic transmission on a basis of the target gear shift ratio.

(6) The control method for the automatic transmission as set forth in item (5), wherein the first predetermined value is larger than the second predetermined value and wherein when the accelerator pedal opening angle is smaller than the first predetermined value but is equal to or smaller than the second predetermined value, the target gear shift ratio is calculated on a basis of a weighted vehicle speed for which the read-ahead vehicle speed and the actual vehicle speed are weighted in accordance with the accelerator pedal opening angle.

The invention claimed is:

1. A control device for an automatic transmission in which a speed ratio between an input shaft connected to an engine side of a vehicle and an output shaft connected to a driving system of the vehicle is modified, the control device comprising:
vehicle speed detecting means for detecting an actual vehicle speed, which is a traveling speed of the vehicle;
vehicle speed estimating means for calculating a read-ahead vehicle speed, which is a target future vehicle speed at a predetermined time, based on the actual vehicle speed and an acceleration component speed;

accelerator pedal opening angle detecting means for detecting an accelerator pedal opening angle;

target gear shift ratio calculating means for calculating a target gear shift ratio based on the read-ahead vehicle speed and the accelerator pedal opening angle when the accelerator pedal opening angle is equal to or larger than a first predetermined value and for calculating the target gear shift ratio based on the actual vehicle speed and the accelerator pedal opening angle when the accelerator opening angle is smaller than a second predetermined value; and gear shift control means for controlling the automatic transmission based on the target gear shift ratio.

2. The control device for the automatic transmission as claimed in claim 1, wherein the first predetermined value is larger than the second predetermined value, and wherein the target gear shift ratio calculating means calculates the target gear shift ratio based on a weighted vehicle speed for which the read-ahead vehicle speed and the actual vehicle speed are weighted in accordance with the accelerator opening angle when the accelerator opening angle is smaller than the first predetermined value but is equal to or larger than the second predetermined value.

3. A control device for an automatic transmission, the automatic transmission being configured to modify a speed ratio between an input shaft connected to an engine side of a vehicle and an output shaft connected to a driving system of the vehicle, the control device comprising:

a vehicle speed detection section configured to detect an actual vehicle speed, which is a traveling speed of the vehicle;

an accelerator pedal opening angle detecting section configured to detect an accelerator pedal opening angle; and a controller, the controller being configured to calculate a read-ahead vehicle speed, which is a target future vehicle speed at a predetermined time, based on the actual vehicle speed and an acceleration component speed, to calculate a target gear shift ratio based on the read-ahead vehicle speed and the accelerator pedal opening angle when the accelerator pedal opening angle is equal to or larger than a first predetermined value, to calculate the target gear shift ratio based on the actual vehicle speed and the accelerator pedal opening angle when the accelerator pedal opening angle is smaller than a second predetermined value, and to control the automatic transmission based on the target gear shift ratio.

4. The control device for the automatic transmission as claimed in claim 3, wherein the first predetermined value is larger than the second predetermined value, and wherein the controller calculates the target gear shift ratio based on a weighted vehicle speed for which the read-ahead vehicle speed and the actual vehicle speed are weighted in accordance with the accelerator pedal opening angle, when the accelerator opening angle is smaller than the first predetermined value but is equal to or larger than the second predetermined value.

5. A control method for an automatic transmission, the automatic transmission being configured to modify a speed ratio between an input shaft connected to an engine side of a vehicle and an output shaft connected to a driving system of the vehicle, the control method comprising:

detecting an actual vehicle speed, which is a traveling speed of the vehicle, through vehicle speed detecting means;

detecting an accelerator pedal opening angle through accelerator pedal opening angle detecting means;

calculating a read-ahead vehicle speed, which is a target future vehicle speed at a predetermined time, based on the actual vehicle speed and an acceleration component speed with an electronic controller;

calculating a target gear shift ratio based on the read-ahead vehicle speed and the accelerator pedal opening angle when the accelerator opening angle is equal to or larger than a first predetermined value with the electronic controller;

calculating the target gear shift ratio based on the actual vehicle speed and the accelerator pedal opening angle when the accelerator opening angle is smaller than a second predetermined value with the electronic controller; and controlling the automatic transmission based on the target gear shift ratio with the electronic controller.

6. The control method for the automatic transmission as claimed in claim 5, wherein the first predetermined value is larger than the second predetermined value, and wherein when the accelerator pedal opening angle is smaller than the first predetermined value but is equal to or larger than the second predetermined value, the target gear shift ratio is calculated based on a weighted vehicle speed for which the read-ahead vehicle speed and the actual vehicle speed are weighted in accordance with the accelerator pedal opening angle.

* * * * *